US011704660B2

(12) United States Patent
Williams et al.

(10) Patent No.: US 11,704,660 B2
(45) Date of Patent: Jul. 18, 2023

(54) SYSTEMS AND METHODS FOR TOKEN TRANSFER BETWEEN MOBILE COMPUTING DEVICES (71) Applicant: MASTERCARD INTERNATIONAL INCORPORATED, Purchase, NY (US)

(72) Inventors: Kyle Williams, Wentzville, MO (US); David J. Senci, Troy, IL (US); Brett J. Thomson, Lake Saint Louis, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 180 days.

(21) Appl. No.: 16/817,323

(22) Filed: Mar. 12, 2020

(65) Prior Publication Data
US 2021/0287207 A1 Sep. 16, 2021

(51) Int. Cl.
*G06Q 20/36* (2012.01)
*G06F 16/2455* (2019.01)
(Continued)

(52) U.S. Cl.
CPC ..... *G06Q 20/3672* (2013.01); *G06F 16/2455* (2019.01); *G06Q 20/108* (2013.01); *G06Q 20/3223* (2013.01); *G06Q 40/02* (2013.01); *H04W 4/20* (2013.01); *H04W 4/50* (2018.02); *H04W 8/24* (2013.01)

(58) Field of Classification Search
None
See application file for complete search history.

(56) References Cited

U.S. PATENT DOCUMENTS 9,043,609 B2  5/2015  Calman
2015/0327072 A1  11/2015  Powell et al.
(Continued)

FOREIGN PATENT DOCUMENTS

EP  2018733 A1  1/2009

OTHER PUBLICATIONS

"Raja, How to transfer all data from old phone to a new Android phone, May 20, 2019" (Year: 2019).*

Primary Examiner — Kito R Robinson
Assistant Examiner — Toan Duc Bui
(74) Attorney, Agent, or Firm — Armstrong Teasdale LLP (57) ABSTRACT Described are systems and methods for transferring a token between mobile computing devices. A token transfer processing computing device includes a memory device for storing data and a processor in communication with the memory device. The processor is programmed to receive a token transfer message. The token transfer message includes a current device identifier associated with a current mobile device having an original token associated therewith for initiating secure payments using the current mobile device, and a new device identifier associated with a new mobile device replacing the current mobile device. The processor is further programmed to perform a lookup in a device-to-token mapping table to identify the original token associated with the current mobile device. The processor further generates an updated token associated with the payment account and transmits a token transfer response to the new mobile device. The token transfer response includes the updated token.

12 Claims, 6 Drawing Sheets (51) Int. Cl.
*G06Q 40/02* (2023.01)
*H04W 4/20* (2018.01)
*G06Q 20/10* (2012.01)
*H04W 8/24* (2009.01)
*H04W 4/50* (2018.01)
*G06Q 20/32* (2012.01)

(56) References Cited

U.S. PATENT DOCUMENTS

| | | | |
|---|---|---|---|
| 2016/0241402 A1 | 8/2016 | Gordon et al. | |
| 2016/0260084 A1 | 9/2016 | Main et al. | |
| 2017/0068939 A1* | 3/2017 | Groarke | G06Q 20/20 |
| 2017/0357976 A1* | 12/2017 | Malik | H04L 63/0807 |
| 2018/0144322 A1* | 5/2018 | Unnerstall | G07F 13/025 |
| 2018/0288570 A1* | 10/2018 | Bakshi | H04W 4/023 |
| 2019/0200218 A1* | 6/2019 | Redberg | H04L 9/12 |
| 2019/0268332 A1* | 8/2019 | Wang | G06F 21/32 |
| 2021/0287207 A1* | 9/2021 | Williams | G06Q 20/322 |

\* cited by examiner

FIG. 1

| Device-to-Token Mapping Table | |
|---|---|
| Device Identifier | Token |
| ###-ABCD | 1###-##### |
| ###-EFGH | 2###-##### |

FIG. 2

Token-to-Account Mapping Table — 122

| Token | Account | Issuer |
|---|---|---|
| 1###-#### | 1000-########-## | A-####-##### |
| 2###-#### | 2000-########-## | B-####-##### |

302 — Token column
304 — Account column
306 — Issuer column
300 — rows

SYSTEMS AND METHODS FOR TOKEN TRANSFER BETWEEN MOBILE COMPUTING DEVICES

BACKGROUND

The field of the present disclosure relates generally to tokens provisioned to mobile computing devices for secure payments, and more particularly to systems and methods for transferring a secure token from one mobile device to another that eliminates delays or lapses in functionality of a digital wallet when a person replaces one mobile device with another mobile device.

A consumer may purchase, lease, or otherwise acquire a new (or used) electronic device, such as a mobile device (e.g., mobile phone), in order to replace or upgrade their current mobile device. That same consumer may utilize their mobile device to initiate a purchase transaction. For example, the consumer may have a digital wallet or other mobile payment systems stored and executable on their mobile device that allowed them to make payments with that mobile device.

In some cases, a token may be provisioned on the mobile device to enhance security of payment transactions conducted using the digital wallet or other mobile payment systems stored or executed on the mobile device. During a token provisioning process, the consumer's actual payment credentials are exchanged for tokenized payment credentials by a secure party. For example, the consumer may enter payment credentials including the consumer's payment account number, credit card information, and/or other payment information such as the consumer's billing address, into data fields provided by the mobile payment system (e.g., the digital wallet). In return, the secure party or token provider provides the consumer with a secure token. The token provider then saves the actual payment credentials and links this data to the provided token. Thus, when the consumer makes a payment on their mobile device, the token is provided to the merchant (or other payee) instead of the actual payment credentials. During a transaction, the merchant provides the token to a payment processing network or issuer, which retrieves the actual payment credentials using the provided token. In so doing, the actual payment credentials are better secured.

Unfortunately, after acquiring a new mobile device, the consumer must perform the time consuming process of initiating a new token provisioning request for each mobile payment system stored on the new mobile device. For example, the consumer may need to re-enter their payment credentials or other information into the mobile payment system to initiate a new token provisioning request for the new mobile device. This provisioning process is disruptive, time consuming, and frustrating for the consumer. In some cases, the consumer may experience lapses in their mobile payment systems.

It is desirable to provide methods and systems that automatically provision a new mobile device by transferring a token from the current device to the new mobile device such that mobile payment technologies executed on the new mobile device are enabled providing a seamless payment experience for a customer purchasing a new mobile device.

BRIEF DESCRIPTION

In one aspect, a token transfer processing computing device including at least one memory device for storing data and a processor in communication with the at least one memory device is provided. The processor is programmed to receive, from a telecommunication service provider computing device, a token transfer message, the token transfer message including a current device identifier associated with a current mobile device having an original token associated therewith for initiating secure payments using the current mobile device, and a new device identifier associated with a new mobile device replacing the current mobile device. The processor is also programmed to perform a lookup in a device-to-token mapping table stored in the at least one memory device using the current device identifier to identify the original token associated with the current mobile device. The original token is further associated with a payment account issued by an issuer to a user of the current mobile device. The processor is further programmed to generate an updated token associated with the payment account and the new mobile device, and transmit a token transfer response to the new mobile device, the token transfer response including the updated token associated with the payment account and enabled to initiate secure payment transactions with the new mobile device.

In another aspect, a computer-implemented method for transferring a token is provided. The method is implemented using a computing device including a processor in communication with at least one memory device for storing data. The method includes receiving, from a telecommunication service provider computing device, a token transfer message, the token transfer message including a current device identifier associated with a current mobile device having an original token associated therewith for initiating secure payments using the current mobile device, and a new device identifier associated with a new mobile device replacing the current mobile device. The method also includes performing a lookup in a device-to-token mapping table stored in the at least one memory device using the current device identifier to identify the original token associated with the current mobile device. The original token is further associated with a payment account issued by an issuer to a user of the current mobile device. The method further includes generating an updated token associated with the payment account and the new mobile device, and transmitting a token transfer response to the new mobile device, the token transfer response including the updated token associated with the payment account and enabled to initiate secure payment transactions with the new mobile device.

In yet another aspect, a non-transitory computer-readable storage medium that includes computer-executable instructions for transferring a token is provided. When executed by a token transfer computing device including a processor in communication with at least one memory device, the computer-executable instructions cause the processor to receive, from a telecommunication service provider computing device, a token transfer message, the token transfer message including a current device identifier associated with a current mobile device having an original token associated therewith for initiating secure payments using the current mobile device, and a new device identifier associated with a new mobile device replacing the current mobile device. The computer-executable instructions also cause to processor to perform a lookup in a device-to-token mapping table stored in the at least one memory device using the current device identifier to identify the original token associated with the current mobile device. The original token is further associated with a payment account issued by an issuer to a user of the current mobile device. The computer-executable instructions also cause to processor to generate an updated token associated with the payment account and the new mobile device, and transmit a token transfer response to the new mobile device, the token transfer response including the updated token associated with the payment account and enabled to initiate secure payment transactions with the new mobile device.

BRIEF DESCRIPTION OF THE DRAWINGS

FIGS. 1-6 show example embodiments of the methods and systems described herein.

DETAILED DESCRIPTION

The systems and methods described herein are directed to automatically transferring a token used to initiate secure payment transactions from a first, current mobile device to a second, new mobile device. This transfer may occur when a user purchases a new mobile device to replace their current mobile device, and the user wants to continue to initiate payment transactions using their new mobile device.

As used herein, a "new" mobile device refers to any replacement mobile device that is purchased, leased, or otherwise acquired by a user to replace their current or existing mobile device. The new mobile device may be a brand new mobile device, or may be a used, refurbished, or otherwise not brand new device that is, in any case, new to the user.

A user (also referred to herein as a payor, customer, consumer, or cardholder) may purchase a new mobile device to replace or as part of an exchange of the customer's current mobile device. A "mobile device" may be, for example, a mobile phone or "smart phone" with capabilities for initiating a payment transaction conducted over a payment card network using mobile payment systems (e.g., a digital wallet) stored and/or executed on the mobile device. The mobile device may be an electronic computing device, such as but not limited to, a smart phone, such as an "PHONE® or one of the numerous smartphone models that run the ANDROID® operating system. (IPHONE is a registered trademark of Apple Inc. of Cupertino, Calif.; and ANDROID is a registered trademark of Google LLC of Mountain View, Calif.) Alternatively, the mobile device may be a tablet computer, such as the IPAD®. (IPAD is a registered trademark of Apple Inc. of Cupertino, Calif.) The customer may periodically purchase a new mobile device in order to keep up with the latest mobile device technology or to replace a damaged current mobile device.

In the example embodiment, a mobile payment system (e.g., a digital wallet) may have been previously installed on the current mobile device. In some embodiments, the mobile payment system includes computer-executable instructions that are executed on the mobile device, and enables a user to initiate a payment transaction by interacting with a website or app operated by at least one of the mobile payment system (e.g., the digital wallet provider), a merchant, and/or an issuer of the user's payment card account. For example, digital wallet or mobile payment system providers may include "APPLE PAY", "GOOGLE PAY", or "SAMSUNG PAY", and example merchants may include "NETFLIX" or "AMAZON".

In the example embodiment, to enable secure use of the mobile payment system(s) on the current mobile device, an original token has been previously provisioned for use with the mobile payment system on the current mobile device. For example, the user previously provided their actual payment credentials (e.g., a credit or debit card number, a bank account number, or a primary account number (PAN)) during a registration or token provisioning process on the current mobile device. The payment credentials are sent to a secure party or token provider (such as a payment processor computing device or the issuer of the payment credentials). The token provider facilitates the token provisioning process by exchanging the customer's payment credentials for a tokenized payment credential or "token" that may be used to initiate a secure payment transaction. The mobile payment system provides the token for use in lieu of the actual payment credentials. In some embodiments, the token is unique to the current mobile device, such that the token can only be used with mobile payment systems executed on the current mobile device. Using the token to initiate a transaction, rather than the actual payment credentials, reduces the risk that the payment credentials will be compromised (e.g., by being stored on the current mobile device or provided to a merchant that may experience a data breach).

As described above, when a customer obtains a new mobile device, the new mobile device has no token(s) provisioned thereto, so any mobile device system will need to be re-provisioned in order to retain the security of the user's payment credentials during transactions initiated using the new mobile device. The systems and processes described herein facilitate automatically provisioning a token to the new mobile device, specifically by transmitting and receiving a plurality of messages between a telecommunication service provider, an issuer, and a token provider, which may include a payment processing network.

The user, who has a payment account with the issuer, purchases a new mobile device at a telecommunication service provider. The telecommunication service provider then may transmit a token transfer message to the token provider (e.g., the payment processing network). The token transfer message includes a device identifier of the current mobile device (i.e., a "current device identifier"), and a device identifier of the new mobile device (i.e., a "new device identifier"). A device identifier is, for example, an alphanumeric value that uniquely identifies a mobile device. For example, a device identifier may be a telephone number or, in some embodiments, a device identifier may be an alphanumeric code generated by the mobile device manufacturer. The token transfer message may also include an original token enabled on and associated with the current mobile device.

The token provider processes the token transfer message to automatically provision a token to the new mobile device.

Specifically, the token provider uses the current device identifier to identify the original token associated with the current device. For example, the token provider uses the current device identifier to perform a look-up in a device-to-token mapping table to retrieve original token associated with the current device. Where the token transfer message also includes the original token, the original token retrieved from the device-to-token mapping table may be compared to the original token received in the token transfer message to confirm that the original token is associated with the current mobile device.

Once the association between the current mobile device and the original token has been identified and/or verified, the token provider may use the original token to identify the payment account associated with the original token and the issuer of the payment account. In some embodiments, the token provider may perform a lookup in a token-to-account mapping table using the original token to identify the payment account and issuer thereof associated with the original token. The token provider may request approval from the issuer to issue an updated token associated with the same payment account to the new device. If approved, the payment processing network may then automatically generate and provision the updated token to the new mobile device, such that the consumer may experience uninterrupted ability to initiate secure payments using their new mobile device. The updated token may be the original token or may be a new token different from the original token (e.g., a token generated based on payment credentials associated with the payment account and the new device identifier).

As used herein, a token provider may include a "payment processing network," which refers broadly to the network and/or to one or more computing devices associated therewith (e.g., payment processors or payment processing computing devices). A payment processing network includes a set of proprietary communications standards for the exchange of financial transaction data and the settlement of funds between financial institutions. Moreover, a payment processing network is configured to process payment/purchase transactions for a plurality of cardholders with a plurality of merchants, by transmitting various authorization request and response messages between parties to the transaction (e.g., the merchant, an acquirer, and an issuer).

The token provider is configured to provision tokens for use on a mobile device to enable secure payment transactions with a mobile payment system. In the example embodiment, the token provider includes a token transfer computing device that is configured to provision a token to a mobile device for user with mobile payment systems stored and/or executed on the mobile device. The token transfer computing device is communicatively connected to a telecommunication service provider.

The telecommunication service provider is a telephone service provider (e.g., telco, telecommunications operator, and/or telephone company, such as VERIZON, SPRINT, etc.) and/or a communication service provider that provides services to a consumer such as telephony and data communication access. The telecommunication service provider includes a telecommunication computing device configured to transmit and receive messages to and from the token transfer computing device.

The systems and processes described herein for transferring a token to a new mobile device are implemented, at least in part, by the token transfer computing device, the telecommunication service provider, the issuer, and the user. The user wishing to provision a new mobile device may initiate a token transfer process with the telecommunication service provider. The telecommunication service provider may transmit a token transfer message to the token transfer computing device. The token transfer computing device may then perform a lookup operation to identify a token. The token provider may then generate an updated token and transmit a token transfer response message including the updated token to the new mobile device.

At least one technical problem to be solved by the systems and methods provided herein includes: (i) non-functionality of mobile payment systems (e.g., digital wallets) on new mobile devices until a token is provisioned, (ii) disruption of scheduled payments initiated using an original token when a current mobile device is replaced by a new mobile device, and (iii) the time consuming process for a user to provision a token to a new mobile device.

The technical effect of the systems and processes described herein may achieved by performing at least one of the following steps: (i) receive a token transfer message including a current device identifier associated with a current mobile device having an original token associated therewith for initiating secure payments using the current mobile device and a new device identifier associated with a new mobile device replacing the current mobile device, (ii) perform a lookup operation in a device-to-token mapping table stored in at least on memory device using the current device identifier to identify the original token, (iii) generate an updated token associated with the payment account and the new mobile device, and (iv) transmit a token transfer response to the new mobile device, the token transfer response including the updated token associated with the payment account and enabled to initiate secure payment transactions with the new mobile device.

A technical effect or improvement provided by the systems and processes described herein include at least one of: (i) facilitating automatic provisioning of a token to a new mobile device replacing an current mobile device, (ii) enabling a cardholder to continue using their preferred or existing mobile payment systems using a new mobile device without any disruption in payment services, and (iii) enabling a cardholder to continue using mobile payment systems using a new mobile device without requiring the customer to re-register a token manually.

As used herein, the term "processor" may include any programmable system including systems using micro-controllers, reduced instruction set circuits (RISC), application specific integrated circuits (ASICs), logic circuits, and any other circuits or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and thus are not limiting as to the types of memory usable for saving of a computer.

In one embodiment, a computer program is provided, and the program is embodied on a computer readable medium. In an example embodiment, the data optimization system is executed on a single computer system, without requiring a connection to a server computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, a card that is part of a digital wallet, and/or any other device that may hold payment account information, such as mobile phones, smartphones, personal digital assistants (PDAs), key fobs, and/or computers. Each type of transaction card can be used as a method of payment for performing a transaction. As used herein, the term "payment account" is used generally to refer to the underlying account associated with the transaction card.

The following detailed description illustrates embodiments of the disclosure by way of example and not by way of limitation. It is contemplated that the disclosure has general application to processing financial transaction data by a third party in industrial, commercial, and residential applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

Figure 1:
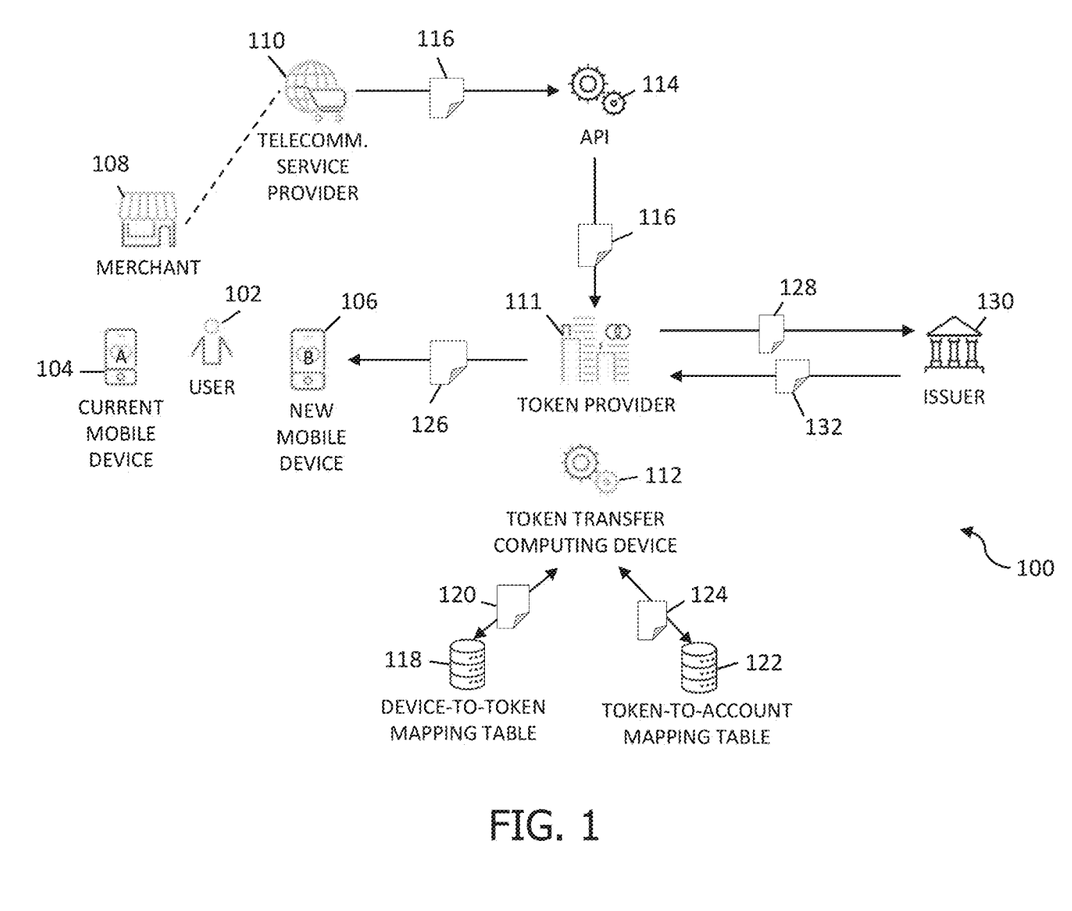
FIG. 1 is a simplified schematic diagram of a token transfer system implementing an example data flow for transferring a token from a first or current mobile device to a second or new mobile device.

FIG. 1 is a schematic diagram of an example embodiment of a token transfer system 100, used to implement a token transfer process in accordance with the present disclosure. Token transfer system 100 includes, in the example embodiment, a telecommunication service provider 110, a token provider 111, and an issuer 130.

As illustrated in FIG. 1, a user 102 (also referred to herein as a payor, customer, or cardholder) owns a payment-enabled current mobile device 104. Current mobile device 104 may take the form of a conventional smartphone, tablet computer, personal digital assistant, or the like. User 102 may purchase a new mobile device 106 at a merchant 108 associated with telecommunication service provider 110 (e.g., telecommunication operator or telephone company). For example, user 102 may wish to replace current mobile device 104 for the latest mobile device technology, and user 102 may purchase new mobile device 106 at merchant 108 associated with telecommunication service provider 110. New mobile device 106 may be any type of mobile device suitable for performing the functions disclosed herein, such as a cellular phone, smart phone, tablet computer, personal digital assistant, or the like.

Current mobile device 104 is provisioned with an original token such that mobile payment systems stored and/or executed on current mobile device 104 may be used to initiate secure payments using the original tokens, to enhance security for payments initiated by the mobile payment systems stored and/or executed on current mobile device 104. User 102 may wish to quickly and efficiently provision mobile payment systems executed on new mobile device 106, such that user 102 may experience no interruptions in their ability to make secure payments when transitioning between current mobile device 104 and new mobile device 106.

Telecommunication service provider 110 includes a telecommunication computing device configured to transmit and receive messages to/from a token transfer computing device 112.

In the example embodiment, token transfer computing device 112 is associated with token provider 111. In some embodiments, token provider 111 includes a payment processing network, and token transfer computing device 112 is integral thereto. In other such embodiments, token transfer computing device 112 may be separate from the payment processing network.

In the illustrated embodiment, the telecommunication computing device associated with telecommunication service provider 110 utilizes an application program interface (API) 114 to facilitate communication between token transfer computing device 112 and the telecommunication computing device associated with telecommunication service provider 110. Alternatively, the telecommunication computing device includes any suitable communication interface to communicate with token transfer computing device 112.

Telecommunication service provider 110 transmits a token transfer message 116 to token transfer computing device 112. Token transfer message 116 includes a current device identifier associated with current mobile device 104 and a new device identifier associated with new mobile device 106. In some embodiments, token transfer message 116 also includes the original token associated with and provisioned to current mobile device 104.

Both current mobile device 104 and new mobile device 106 have a respective device identifier associated therewith. The device identifier is a value, alphanumeric code, or other data element that uniquely identifies a mobile device. Accordingly, the device identifiers distinguish between current mobile device 104 and new mobile device 106. Current mobile device 104 has a current device identifier associated therewith, and new mobile device 106 has with a new device identifier associated therewith. A device identifier may be provided by the telephone service provider, or the device identifier may be provided by the device manufacturer. In other example embodiments, the device identifier may be any code or value that enables current mobile device 104 and new mobile device 106 to be distinguishable from other mobile devices and each other.

Token transfer computing device 112 processes token transfer message 116 to automatically provision a token to new mobile device 106. Specifically, token transfer computing device 112 uses the current device identifier to identify the original token associated with current mobile device 104. For example, token transfer computing device 112 uses the current device identifier to perform a look-up in a device-to-token mapping table 118 (shown in greater detail in FIG. 2) to retrieve the original token associated with current mobile device 104. In other words, token transfer computing device 112 may retrieve a token record 120 from device-to-token mapping table 118. Token record 120 includes the original token associated with current mobile device 104. In example embodiments, when token transfer message 116 also includes the original token, token transfer computing device 112 may compare the original token retrieved from device-to-token mapping table 118 to the original token received in token transfer message 116 to confirm that the original token is associated with current mobile device 104.

Once the association between current mobile device 104 and the original token has been identified and/or verified, token transfer computing device 112 may use the original token to identify a payment account associated with the original token and the issuer of the payment account (e.g., issuer 130). In some embodiments, token transfer computing device 112 may perform a lookup in a token-to-account mapping table 122 (shown in greater detail in FIG. 3) using the original token to identify the payment account and issuer thereof associated with the original token. In other words, token transfer computing device 112 may retrieve an account record 124 from the token-to-account mapping table 122. Account record 124 includes a payment account number associated with the payment account.

Token provider 111 (e.g., a payment processing network) may then automatically generate and provision the updated token to new mobile device 106, such that user 102 may experience uninterrupted ability to initiate secure payments using their new mobile device 106. Token transfer computing device 112 may transmit a token transfer response 126 to new mobile device 106. Token transfer response 126 includes the updated token associated with the payment account and enabled to initiate secure payment transactions with new mobile device 106.

In some embodiments, the updated token may be the original token or may be a new token different from the original token (e.g., a token generated based on payment credentials associated with the payment account and the new device identifier). When the updated token is the same as the original token, a token transfer computing device 112 may associate the original token with new mobile device 106 by updating device-to-token mapping table 118 to include a new entry (e.g., a new token record) mapping the original token to new mobile device 106 (e.g., mapping the original token to the new device identifier). Alternatively, token transfer computing device 112 may associate the original token with new mobile device 106 by updating token record 120 to include the new device identifier rather then the current device identifier.

When the updated token is different from the original token, token transfer computing device 112 may update device-to-token mapping table 118 to include an entry (e.g., a new token record) mapping the updated token to new mobile device 106 (e.g., mapping the original token to the new device identifier). In addition, token transfer computing device 112 may update token-to-account mapping table 122 to include an entry (e.g., a new account record) mapping the updated token to the existing payment account. Alternatively, token transfer computing device 112 may associated the updated token with the existing payment account by updating (existing) account record 124 to include the updated token rather than the original token.

In some example embodiments, before generating the updated token, token transfer computing device 112 may transmit a token provisioning request message 128 to issuer 130 to request approval to provision new mobile device 106 with an updated token associated with the payment account. Token provisioning request message 128 may include the original token and the payment account number of the payment account. Token provisioning request message 128 may further include the new device identifier of new mobile device 106.

Issuer 130 may process token provisioning request message 128 and transmit a transfer approval message 132 in response to token provisioning request message 128. Transfer approval message 132 includes an approval to provision new mobile device 106 with the updated token associated with the payment account.

In some example embodiments, token transfer computing device may disable the original token on current mobile device 104, such that the original token is unusable with any mobile payment system(s) stored and/or executed on current mobile device 104.

Figure 2:
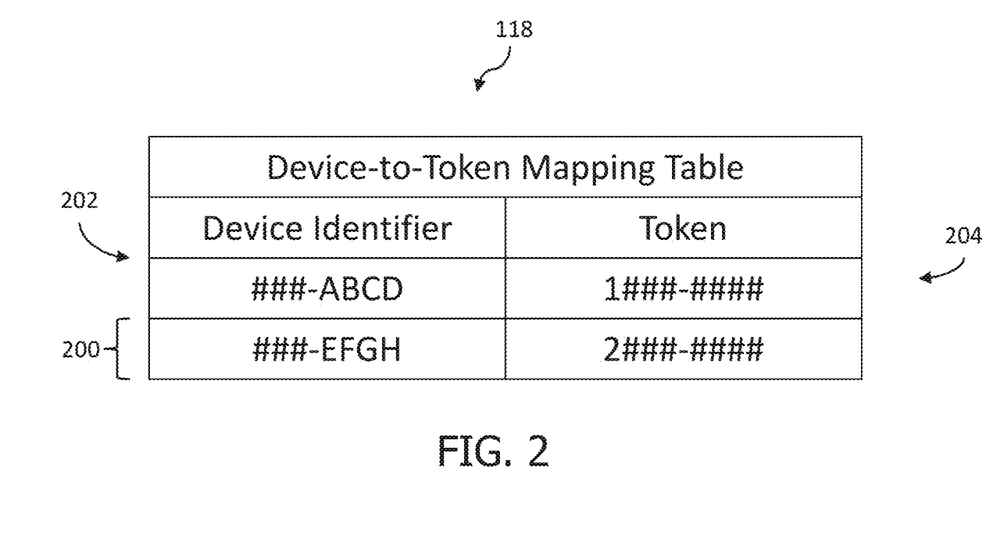
FIG. 2 depicts an example device-to-token mapping table for identifying an original token associated with a current mobile device for use with the token transfer system shown in FIG. 1.

FIG. 2 is a depiction of an example device-to-token mapping table, such as device-to-token mapping table 118, for use with token transfer system 100, shown in FIG. 1. Device-to-token mapping table 118 may be stored in at least one memory device communicatively coupled to token transfer computing device 112 (also shown in FIG. 1). Device-to-token mapping table 118 includes a plurality of entries or token records 200 (such as token record 120, shown in FIG. 1). Each entry includes a device identifier 202 and a token 204 mapped or assigned to each device identifier 202. Device identifier 202 is a value, alphanumeric code, or other data element that uniquely identifies a device. For example, device identifier 202 can be used to distinguish between a current mobile device (e.g., current mobile device 104) and a new mobile device (e.g., a new mobile device 106). Device-to-token mapping table 118 may include alternative or additional device identifiers 202 associated with alternative mobile devices. In some example embodiments, device identifiers 202 may be provided by a telecommunications service provider, or device identifier 202 may be provided by a device manufacturer.

Each token 204 in an entry 200 has been previously provisioned for use with the mobile device identified by the associated device identifier 202. A mobile payment system stored and/or executed on the mobile device having the associated device identifier provides token 204 for use in lieu of the actual payment credentials. In some embodiments, token 204 is unique to a particular mobile device, such that token 204 can only be used with mobile payment systems executed on that device.

Figure 3:
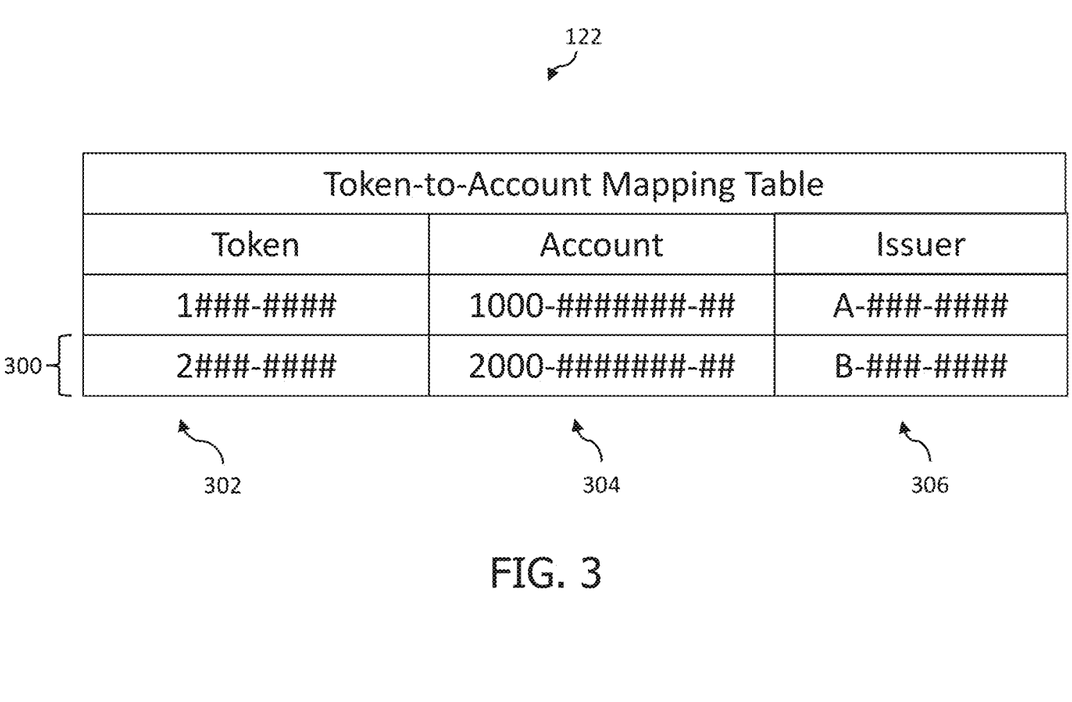
FIG. 3 depicts an example token-to-account mapping table for identifying a payment account for use with token transfer system shown in FIG. 1.

FIG. 3 is a depiction of an example token-to-account mapping table, such as token-to-account mapping table 122, for use with token transfer system 100, shown in FIG. 1. Token-to-account mapping table 122 may be stored in at least one memory device communicatively coupled to a token transfer computing device (e.g., token transfer computing device 112, shown in FIG. 1).

Token-to-account mapping table 122 includes a set of entries or account records 300 (such as account record 124, shown in FIG. 1). Each entry includes a token 302 (which may be the same as tokens 204, shown in FIG. 2) and an account number 304 associated with the respective token 302 and an issuer (e.g., issuer 130, FIG. 1) of a payment account having account number 304. Token-to-account mapping table 122 may be populated by a token provider (e.g., token provider 111, shown in FIG. 1) and/or by one or more issuer of the payment accounts identified by account numbers 304.

Figure 4:
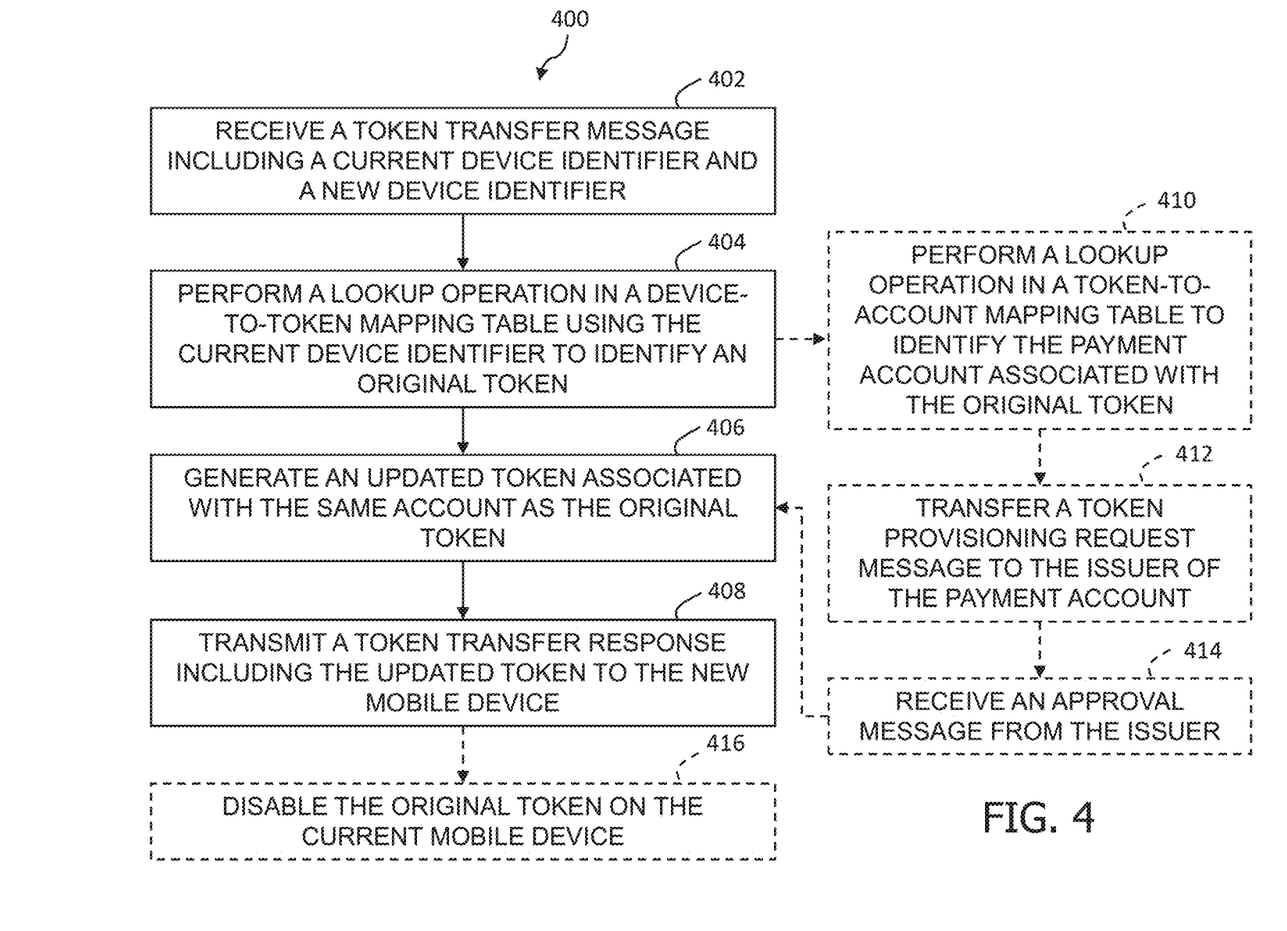
FIG. 4 is a process flow diagram of an example of a token transfer process for provisioning a token to the new mobile device using the token transfer system shown in FIG. 1.

FIG. 4 is a process flow of an example method 400 for automatically provisioning a token from a current mobile device (e.g., current mobile device 104) to a new mobile device (e.g., new mobile device 106) replacing the current mobile device. Method 400 may be implemented at least in part by a token transfer computing device (e.g., token transfer computing device 112, all shown in FIG. 1).

With reference to FIGS. 1 and 2, in the example embodiment, method 400 includes receiving 402, from a telecommunication service provider (e.g., telecommunication service provider 110) a token transfer message (e.g., token transfer message 116). The token transfer message includes a current device identifier associated with the current mobile device having an original token associated therewith for initiating secure payments using the current mobile device. The token transfer message further includes a new device identifier (e.g., device identifier 202) associated with a new mobile device (e.g., new mobile device 106) replacing the current mobile device. Method 400 also includes performing 404 a lookup in a device-to-token mapping table (e.g., device-to-token mapping table 200) stored in the at least one memory device using the current device identifier to identify the original token associated with the current mobile device. The original token is further associated with a payment account issued by an issuer to a user of the current mobile device.

In some example embodiments, the token transfer message further includes the original token associated with the current mobile device. Once the association between the current mobile device and the original token has been identified and/or verified, a token provider may use the original token to identify the payment account associated with the original token and the issuer of the payment account. Method 400 includes generating 406 an updated token associated with the payment account and the new mobile device.

Method 400 further includes transmitting 408 a token transfer response (e.g., token transfer response 126) to the new mobile device. The token transfer response includes the updated token associated with the payment account and enabled to initiate secure payment transactions with the new mobile device.

In some example embodiments, method 400 further includes performing 410 a lookup in a token-to-account mapping table (e.g., token-to-account mapping table 300, shown in FIG. 3) stored in at least one memory device using the original token to identify the payment account associated with the original token and an issuer (e.g., issuer 130) of the payment account. Where the token transfer message also includes the original token, the original token retrieved from the device-to-token mapping table may be compared to the original token received in the token transfer message to confirm that the original token is associated with the current mobile device.

In some example embodiments, method 400 further includes transmitting 412 a token provisioning request message (e.g., token provisioning request message 128) to the issuer requesting approval to provision the new mobile device with the updated token associated with the payment account. The token provisioning request message includes the original token and a payment account number of the payment account. In some example embodiments, the token provisioning request message further includes the new device identifier of the new mobile device.

In some example embodiments, method 400 further includes receiving 414 a transfer approval message (e.g., transfer approval message 132) from the issuer in response to the token provisioning request message. The transfer approval message includes an approval to provision the new mobile device with the updated token associated with the payment account.

In some example embodiments, the updated token is the same as the original token, and generating 406 the updated token includes associating the original token with the new mobile device by updating the device-to-token mapping table to include an entry mapping the original token to the new mobile device.

In some example embodiments, method 400 further includes disabling 416 the original token on the current mobile device, such that the original token is unusable with a mobile payment system stored and/or executed on the current mobile device.

Figure 5:
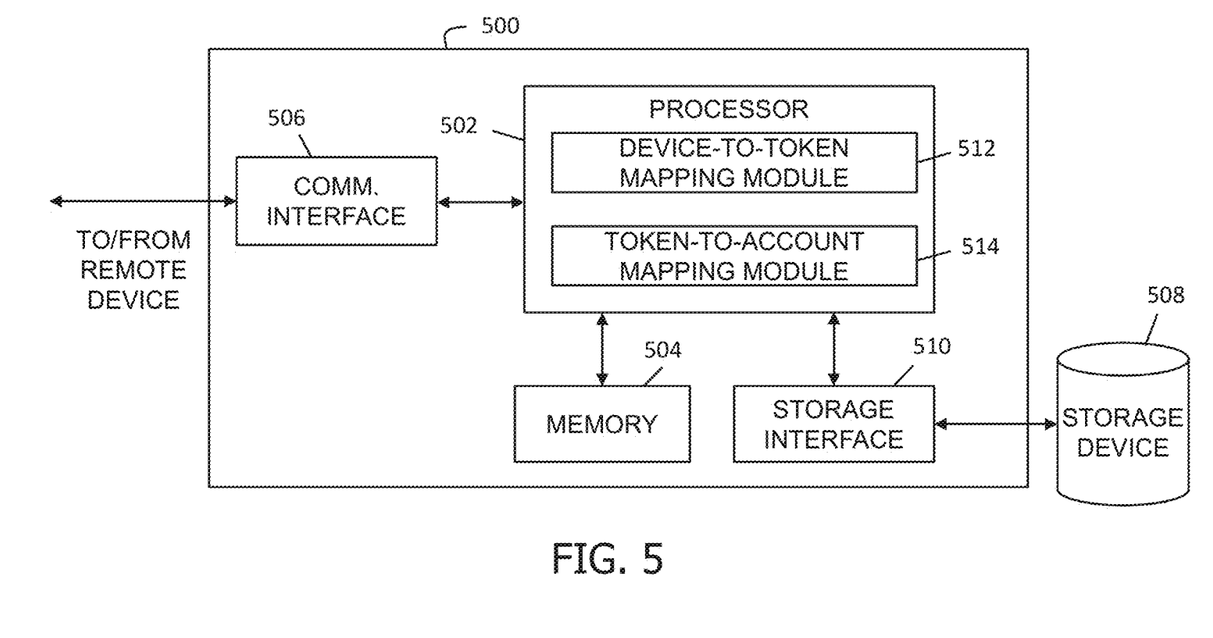
FIG. 5 illustrates an example configuration of a server computing device that may be used in the token transfer system shown in FIG. 1.

FIG. 5 illustrates an example configuration of a server computing device 500 that may be used to implement a token transfer computing device (e.g., token transfer computing device 112) or any other server computing device used in token transfer system 100 (shown in FIG. 1). Server computing device 500 includes a processor 502 for executing instructions. Instructions may be stored in at least one memory 504. Processor 502 may include one or more processing units (e.g., in a multi-core configuration) for executing instructions. The instructions may be executed within a variety of different operating systems on data optimizing computing device, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 502 may be communicatively coupled to, or programmed to execute, a device-to-token mapping module 512 and a token-to-account mapping module 514. In some cases, instructions for executing the device-to-token mapping module and/or the token-to-account mapping modules 512, 514 may be stored in the memory 504. In some cases, the device-to-token and/or token-to-account mapping modules 512, 514 are executed on one or more remote devices.

Processor 502 is operatively coupled to a communication interface 506 such that server computing device 500 is capable of communication with remote devices. Processor 502 may also be operatively coupled to a storage device 508. Storage device 508 is any computer-operated hardware suitable for storing and/or retrieving data. In some embodiments, storage device 508 is integrated in server computing device 500. For example, server computing device 500 may include one or more hard disk drives as storage device 508. In other embodiments, storage device 508 is external to server computing device 500. For example, storage device 508 may include multiple storage units such as hard disks or solid state disks in a redundant array of inexpensive disks (RAID) configuration. Storage device 508 may include a storage area network (SAN) and/or a network attached storage (NAS) system. Storage device 508 may store, for example, the device-to-token mapping table and/or the token-to-account mapping table In some embodiments, processor 502 is operatively coupled to storage device 508 via a storage interface 510. Storage interface 510 is any component capable of providing processor 502 with access to storage device 508. Storage interface 510 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 502 with access to storage device 508.

The at least one memory 504 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM).

The above memory types are exemplary only, and are thus not limiting as to the types of memory usable for storage of a computer program.

Figure 6:
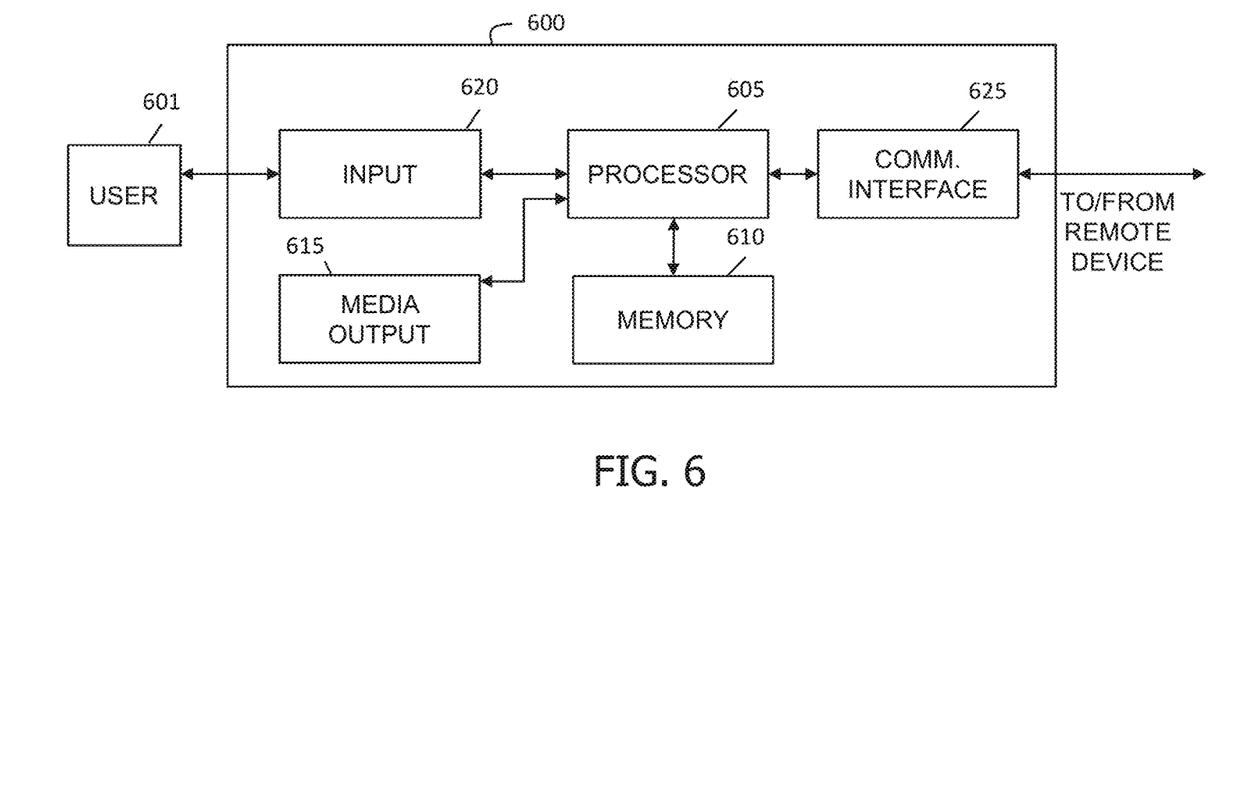
FIG. 6 illustrates an example configuration of a customer computing device with a mobile payment application executed by a processor.

FIG. 6 illustrates an example configuration of a user computing device 600, that may be used to implement the user's new mobile device (e.g., new mobile device 106) or a current mobile device (e.g., current mobile device 104, both shown in FIG. 1). In the example embodiment, user computing device 600, operated by a user 601 (e.g., user 102). User computing device 600 includes a processor 605 for executing instructions, and a memory 610. In some embodiments, executable instructions are stored in memory 610. Processor 605 may, for example, include one or more processing units (e.g., in a multi-core configuration). Memory 610 may, for example, be any one or more devices allowing information such as executable instructions or transaction data to be stored and retrieved. Memory 610 may further include one or more computer readable media.

In the example embodiment, user computing device 600 further includes at least one media output component 615 for presenting information to user 601. Media output component 615 may, for example, be any component capable of converting and conveying electronic information to user 601. In some embodiments, media output component 615 includes an output adapter (not shown), such as a video adapter or an audio adapter, which is operatively coupled to processor 605 and operatively coupleable to an output device (also not shown), such as a display device (e.g., a cathode ray tube (CRT), liquid crystal display (LCD), light emitting diode (LED) display, or "electronic ink" display) or an audio output device (e.g., a speaker or headphones).

In some embodiments, media output component 615 is configured to include and present a graphical user interface (not shown), such as a web browser or a client application, to user 601. The graphical user interface may include, for example, an online store interface for viewing or purchasing items, or a wallet application for managing payment information. In some embodiments, user computing device 600 includes an input device 620 for receiving input from user 601. User 601 may use input device 620, without limitation, to select or enter one or more items to purchase or request to purchase, to access credential information, or to access payment information. Input device 620 may include, for example, a keyboard, a pointing device, a mouse, a stylus, a touch sensitive panel (e.g., a touch pad or a touch screen), a gyroscope, an accelerometer, a position detector, a biometric input device, or an audio input device. A single component such as a touch screen may function as both an output device of media output component 615 and input device 620.

In one embodiment, user computing device 600 further includes a communication interface 625, communicatively coupled to a remote device such as server computing device 500 (shown in FIG. 5). Communication interface 625 may include, for example, a wired or wireless network adapter or a wireless data transceiver for use with a mobile telecommunications network.

In the example embodiment, memory 610 stores computer readable instructions for providing a user interface to user 601 through media output component 615 and, optionally, for receiving and processing input from input device 620. A user interface may include, among other possibilities, a web browser or a client application. Web browsers enable users, such as user 601, to display and interact with media and other information typically embedded on a web page or a web site from server computing device 500. A client application allows user 601 to interact with, for example, server computing device 500. For example, instructions may be stored by a cloud service, and the output of the execution of the instructions sent to the media output component 615.

Processor 605 executes computer-executable instructions for implementing aspects of the disclosure. In some embodiments, the processor 605 is transformed into a special purpose microprocessor by executing computer-executable instructions or by otherwise being programmed.

As will be appreciated based on the foregoing specification, the above-described embodiments of the disclosure may be implemented using computer programming or engineering techniques including computer software, firmware, hardware or any combination or subset thereof, wherein the technical effect or enabling individual chargeback tracking, settlement, and recording. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A token transfer processing computing device comprising:
   at least one memory device for storing data; and
   a processor in communication with said at least one memory device, said processor programmed to:
   upon initiation of telecommunication services for a new mobile device with a telecommunication service provider, receive, from a telecommunication service provider computing device, a token transfer message, the token transfer message including a current device identifier associated with a current mobile device having an original token associated therewith for initiating secure payments using the current mobile device, and a new device identifier associated with the new mobile device replacing the current mobile device, wherein the telecommunication service provider computing device is separate from the current mobile device;

in response to receiving the token transfer message, automatically perform a lookup in a device-to-token mapping table stored in the at least one memory device using the current device identifier to identify the original token associated with the current mobile device, wherein the original token is further associated with a payment account issued by an issuer to a user of the current mobile device;

generate an updated token associated with the payment account and the new mobile device without the user having to submit additional data associated with the payment account;

transmit a token provisioning request message to the issuer requesting approval to provision the new mobile device with the updated token associated with the payment account, wherein the token provisioning request message includes the original token and a payment account number of the payment account;

update the device-to-token mapping table to include an entry mapping the new device identifier, the updated token, and the payment account;

after updating the device-to-token mapping table, transmit a token transfer response to the new mobile device based upon data in the entry in the device-to-token mapping table, the token transfer response including the updated token that is (i) associated with the payment account and (ii) enabled to facilitate secure payment transactions initiated using the new mobile device upon receipt thereof at the new mobile device; and disable the original token on the current mobile device, such that the original token is unusable with a mobile payment system stored on the current mobile device.

2. The token transfer processing computing device of claim 1, wherein the token provisioning request message further includes the new device identifier of the new mobile device.

3. The token transfer processing computing device of claim 1, wherein said processor is further programmed to receive a transfer approval message from the issuer in response to the token provisioning request message, the transfer approval message including an approval to provision the new mobile device with the updated token associated with the payment account.

4. The token transfer processing computing device of claim 1, wherein the updated token is the same as the original token, and wherein to generate the updated token, said processor is programmed to associate the original token with the new mobile device by updating the device-to-token mapping table to include an entry mapping the original token to the new mobile device.

5. The token transfer processing computing device of claim 1, wherein the updated token is different from the original token, and wherein to generate the updated token, said processor is programmed to:

generate the updated token based on the payment account number associated with the payment account and the new device identifier; and update the device-to-token mapping table to include an entry mapping the updated token to the new mobile device.

6. A computer-implemented method for transferring a token, the method implemented using a computing device including a processor in communication with at least one memory device for storing data, said method comprising:

upon initiation of telecommunication services for a new mobile device with a telecommunication service provider, receiving, from a telecommunication service provider computing device, a token transfer message, the token transfer message including a current device identifier associated with a current mobile device having an original token associated therewith for initiating secure payments using the current mobile device, and a new device identifier associated with the new mobile device replacing the current mobile device, wherein the telecommunication service provider computing device is separate from the current mobile device;

in response to receiving the token transfer message, automatically performing a lookup in a device-to-token mapping table stored in the at least one memory device using the current device identifier to identify the original token associated with the current mobile device, wherein the original token is further associated with a payment account issued by an issuer to a user of the current mobile device;

generating an updated token associated with the payment account and the new mobile device without the user having to submit additional data associated with the payment account;

transmitting a token provisioning request message to the issuer requesting approval to provision the new mobile device with the updated token associated with the payment account, wherein the token provisioning request message includes the original token and a payment account number of the payment account;

update the device-to-token mapping table to include an entry mapping the new device identifier, the updated token, and the payment account;

after updating the device-to-token mapping table, transmitting a token transfer response to the new mobile device based upon data in the entry in the device-to-token mapping table, the token transfer response including the updated token that is (i) associated with the payment account and (ii) enabled to facilitate secure payment transactions initiated using the new mobile device upon receipt thereof at the new mobile device; and disabling the original token on the current mobile device, such that the original token is unusable with a mobile payment system stored on the current mobile device.

7. The computer-implemented method of claim 6, wherein the token provisioning request message further includes the new device identifier of the new mobile device.

8. The computer-implemented method of claim 6, further comprising receiving a transfer approval message from the issuer in response to the token provisioning request message, the transfer approval message including an approval to provision the new mobile device with the updated token associated with the payment account.

9. The computer-implemented method of claim 6, wherein the updated token is the same as the original token, and wherein to generate the updated token, said processor is programmed to associate the original token with the new mobile device by updating the device-to-token mapping table to include an entry mapping the original token to the new mobile device.

10. The computer-implemented method of claim 6, wherein the updated token is different from the original token, and wherein to generate the updated token, said processor is programmed to:
generate the updated token based on the payment account number associated with the payment account and the new device identifier; and
update the device-to-token mapping table to include an entry mapping the updated token to the new mobile device.

11. A non-transitory computer-readable storage medium that includes computer-executable instructions for transferring a token, wherein when executed by a token transfer computing device comprising a processor in communication with at least one memory device, the computer-executable instructions cause the processor to:
upon initiation of telecommunication services for a new mobile device with a telecommunication service provider, receive, from a telecommunication service provider computing device, a token transfer message, the token transfer message including a current device identifier associated with a current mobile device having an original token associated therewith for initiating secure payments using the current mobile device, and a new device identifier associated with the new mobile device replacing the current mobile device, wherein the telecommunication service provider computing device is separate from the current mobile device;
in response to receiving the token transfer message, automatically perform a lookup in a device-to-token mapping table stored in the at least one memory device using the current device identifier to identify the original token associated with the current mobile device, wherein the original token is further associated with a payment account issued by an issuer to a user of the current mobile device;
generate an updated token associated with the payment account and the new mobile device without the user having to submit additional data associated with the payment account;
transmit a token provisioning request message to the issuer requesting approval to provision the new mobile device with the updated token associated with the payment account, wherein the token provisioning request message includes the original token and a payment account number of the payment account;
update the device-to-token mapping table to include an entry mapping the new device identifier, the updated token, and the payment account;
after updating the device-to-token mapping table, transmit a token transfer response to the new mobile device based upon data in the entry in the device-to-token mapping table, the token transfer response including the updated token that is (i) associated with the payment account and (ii) enabled to facilitate secure payment transactions initiated using the new mobile device upon receipt thereof at the new mobile device; and
disable the original token on the current mobile device, such that the original token is unusable with a mobile payment system stored on the current mobile device.

12. The non-transitory computer readable medium of claim 6, wherein the token provisioning request message further includes the new device identifier of the new mobile device.

* * * * *